US005543628A

United States Patent [19]
Chow et al.

[11] Patent Number: 5,543,628
[45] Date of Patent: Aug. 6, 1996

[54] QUANTUM WELL INFRARED FILTER

[75] Inventors: David H. Chow, Newberry Park, Calif.;
Colin G. Whitney, Tucson, Ariz.

[73] Assignee: Hughes Aircraft Company, Los Angeles, Calif.

[21] Appl. No.: 289,727

[22] Filed: Aug. 12, 1994

[51] Int. Cl.$^6$ .................. H01L 29/161; H01L 29/205
[52] U.S. Cl. .................. 257/17; 257/21; 359/890; 359/248
[58] Field of Search .................. 257/17, 21, 432, 257/248; 359/890

[56]  References Cited

U.S. PATENT DOCUMENTS

| 4,891,815 | 1/1990 | Ragle et al. | 372/44 |
| 4,903,101 | 2/1990 | Maserjain | 257/21 |
| 5,384,469 | 1/1995 | Choi | 257/21 |

Primary Examiner—Donald Monin
Attorney, Agent, or Firm—Charles D. Brown; Wanda Denson-Low

[57]  ABSTRACT

A controllable infrared filter (22) includes a quantum well filter unit (24) operable to absorb infrared energy at a selected wavelength. The quantum well filter unit (24) has a quantum well layer (26) made of an infrared transparent semiconductor material and a barrier layer (28, 32) of another infrared transparent semiconductor material epitaxially deposited on each side of the quantum well layer (26). There is structure for controllably introducing charge carriers into the quantum well layer (26), which may utilize a source of electrons from other semi conductor layers (36, 38) and an applied voltage, or may utilize a laser (76) that generates charge carriers in the quantum well layer (26). The filter (22) further includes a lens (44, 46) or other optical system for directing infrared radiation through the first barrier layer (28), the quantum well layer (24), and the second barrier layer (32). Fixed band pass optical filters may be used in conjunction with the controllable quantum well filters.

23 Claims, 5 Drawing Sheets

QUANTUM WELL INFRARED FILTER

BACKGROUND OF THE INVENTION

This invention relates to infrared filters, and, more particularly, to a tunable infrared filter using no moving parts.

In some applications, a sensor (consisting of a detector, optics, and electronics) is used to image or analyze a scene. Most scenes that are viewed by a sensor present a spectrum of wavelengths of radiation. It is often desirable to base the sensor analysis on only some components of the spectrum, such as a particular band within the infrared portion of the spectrum.

In some applications the wavelengths of interest to be sensed may change with time. A multispectral sensor system is therefore needed to permit selection of the wavelength being analyzed. In one approach, the detector itself could be made controllably sensitive to particular components of the spectrum. However, a multispectral detector for the infrared is expensive and requires the development of electronic detector and readout technology that does not as yet exist. In another approach, multiple sensors can be used, each sensor being most sensitive to a single wavelength band.

In yet another approach, a filter placed between the scene and the detector is used to selectively pass a particular band of wavelengths of radiation of the spectrum. The filter attenuates all components of the spectrum except for those that are to be analyzed. A less complex broadband sensor can therefore be used.

Various types of filters are known in the art. To achieve selectivity of the wavelength to be passed by the filter, it is common practice to utilize a multipart filter, each part passing a single wavelength band. The usual structure of a multipart filter is a filter wheel, with discrete filtering regions positioned around the circumference of the wheel. The wheel is rotated to place the desired filter between the scene and the detector. The filter wheel tends to be large, heavy, and cumbersome. It is therefore not preferred where the entire sensor system must be small and lightweight.

There is a need for an improved filter, for use in a sensor system, which is controllable to permit only a selected wavelength range to be passed. The filter should be small and light in weight, and have no moving parts that require activation, consume large amounts of power, or might be subject to mechanical failure. The present invention fulfills this need, and further provides related advantages.

SUMMARY OF THE INVENTION

The present invention provides a controllable infrared filter and sensor system, and a method for their fabrication and use. The filter has no moving parts, and is small and lightweight. The filter is activated electrically or optically, rather than mechanically. The filter can be fully transparent or pass only particular wavelengths. The wavelengths to be passed are selected electrically.

In accordance with the invention, a controllable infrared filter comprises a quantum well filter unit operable to absorb infrared energy at a selected wavelength. The quantum well filter unit has a quantum well layer made of an infrared transparent semiconductor material, a first barrier layer made of a second infrared transparent semiconductor material epitaxially contacting a first side of the quantum well layer and having a first barrier layer thickness, and a second barrier layer made of a third infrared transparent semiconductor material epitaxially contacting a second side of the quantum well layer and having a second barrier layer thickness.

The filter also has means for controllably introducing charge carriers into the quantum well layer. The charge carriers can be introduced by providing a first doped cladding layer in contact with the first barrier layer on a contact side remote from the quantum well layer and a second doped cladding layer in contact with the second barrier layer on a contact side remote from the quantum well layer, wherein the first barrier layer thickness is less than the second barrier layer thickness. There is a means for controllably applying a voltage between the first doped cladding layer and the second doped cladding layer. Alternatively, the charge carriers can be introduced by a laser having a beam controllably directed into the quantum well layer, with the laser operating at a beam wavelength that creates charge carriers in the quantum well layer.

The filter also includes means for directing infrared radiation through the first barrier layer, the quantum well layer, and the second barrier layer. Such means for directing can include a lens or mirror system.

When few charge carriers are present in the quantum well, the quantum well filter unit passes all components of the infrared spectrum. When charge carriers are present in the quantum well due to application of an electrical voltage or introduction of laser light, the quantum well filter unit absorbs a portion of the spectrum determined by the dimensions of the quantum well and the materials of construction. Absorption occurs by an intersubband absorption mechanism.

Each quantum well filter unit achieves only partial attenuation in the selected wavelength. To achieve more complete absorption In the selected wavelength, a plurality of the quantum well filter units are arranged In "series" so that the means for directing sends the infrared energy through the plurality of quantum well filters. Attenuation of the selected wavelength increases with increasing numbers of the quantum well filter units.

Another quantum well filter unit can be constructed to selectively absorb a different wavelength of the infrared radiation, by varying the dimensions of the layers and the materials of construction. One or more of this second type of quantum well filter units are placed in series with the first type, so that the infrared energy is directed through all of both types of the quantum well filter units. The attenuated portion of the infrared spectrum is determined by selecting the quantum well filter units to be activated. By extending this principle to the use of additional types of quantum well filter units, there is wide latitude in selecting the band of the infrared spectrum passed through the filter and the degree of discrimination of that selected band.

Other features and advantages of the present invention will be apparent from the following more detailed description of the preferred embodiment, taken in conjunction with the accompanying drawings, which illustrate, by way of example, the principles of the invention.

DETAILED DESCRIPTION OF THE INVENTION

Figure 1:
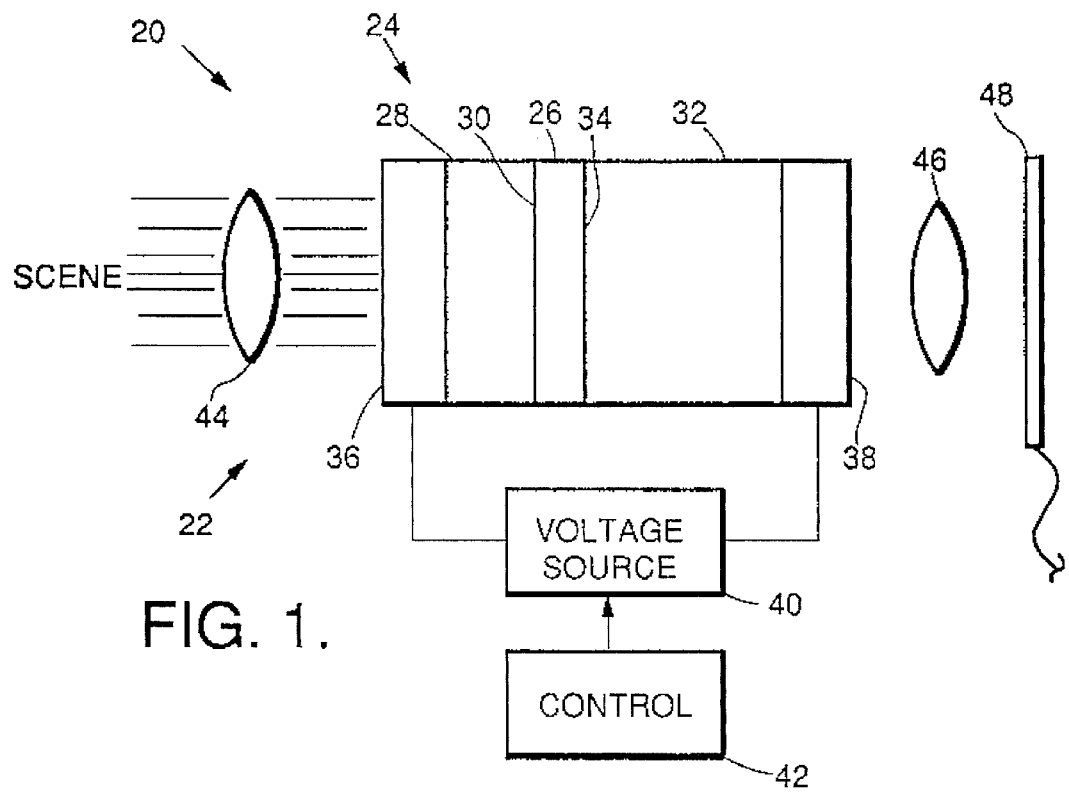
FIG. 1 is an enlarged, schematic side elevational view of one embodiment of an infrared filter with a single quantum well filter unit.

FIG. 1 depicts a sensor system 20 including a controllable filter 22 according to one embodiment of the invention. The controllable filter 22 is based upon a quantum well filter unit 24. FIG. 1, like the other schematic depictions of structure herein, is not drawn to scale.

The quantum well filter unit 24 includes a quantum well layer 26 made of an infrared transparent semiconductor material. A first barrier layer 28, having a first barrier layer thickness, epitaxially contacts a first side 30 of the quantum well layer 26. A second barrier layer 82, having a second barrier layer thickness, epitaxially contacts a second side 84 of the quantum well layer 26, opposite to the first side 30. In the embodiment of FIG. 1, the second barrier layer thickness is greater than the first barrier layer thickness. The first barrier layer 28 is made of a second infrared transparent semiconductor material, and the second barrier layer 32 is made of a third infrared transparent semiconductor material. In the preferred practice, the first barrier layer 28 and the second barrier layer 32 are made of the same semiconductor barrier material.

The quantum well filter unit 24 further includes means for controllably introducing charge carriers into the quantum well layer 26. In the embodiment of FIG. 1, this means for controllably introducing charge carriers includes a first doped cladding layer 36 in contact with the first barrier layer 28 on its side remote from the quantum well layer 26, and a second doped cladding layer 38 in contact with the second barrier layer 32 on its side remote from the quantum well layer 26. A voltage source 40 is connected by leads to the cladding layers 36 and 38, so that z voltage may be applied between the cladding layers 36 and 38, and thence across the first barrier layer 28, the quantum well 26, and the second barrier layer 32. A control 42 is operatively connected to the voltage source 40 to permit operator or computer control of the voltage source 40.

The above description of the quantum well filter unit 24 began with the centermost layer 26, progressed to the adjacent layers 28 and 32, and then moved to the outermost layers 36 and 38, for clarity in description of the functions of the layers. The quantum well filter unit 24 is not fabricated in this manner beginning with the centermost layer 26, however. Instead, it is typically fabricated unidirectionally in the sequence of layers 36, 28, 26, 32, and 38, or the reverse order. The fabrication procedure will be discussed in more detail subsequently.

The filter 22 includes a means for directing infrared radiation through the first barrier layer 28, the quantum well 26, and the second barrier layer 32. This means typically includes an optical system, here depicted generically as lenses 44 and 46, that focuses the infrared energy from a scene through the filter 22 and onto a detector of infrared energy such as a detector 48. The optical system may include more complex elements such as an attenuator, an amplifier, mirrors, other lenses, etc., as needed for particular applications. The details of the design of the optical system will depend upon each individual application, and either or both of the portions 44 or 46 can optionally be omitted. The detector 48 may be of any operable type that is sensitive to infrared radiation, and is preferably a focal plane detector array made of indium antimonide (InSb) or mercury cadmium telluride (HgCdTe). Such detectors are well known in the art, as is the design of optical systems for particular applications.

Figure 2:
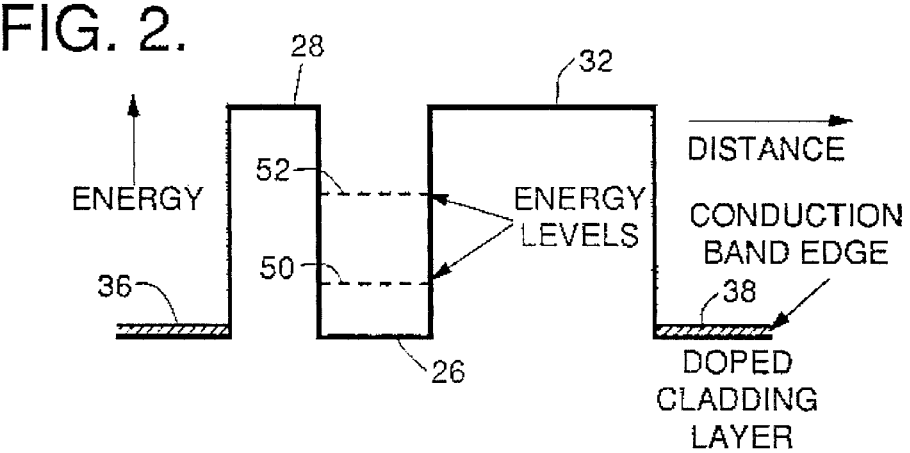
FIG. 2 is a graph depicting charge carrier energy levels in the quantum well of the quantum well filter unit of FIG. 1, in the absence of an applied voltage.

FIG. 2 depicts the electronic structure of the quantum well filter unit 24, in the absence of a voltage applied by the voltage source 40. Energy subbands 50 and 52 are created in the quantum well layer 26 according to known quantum mechanical size effects. When no charge carriers are present, the quantum well filter unit 24 is transparent to infrared radiation. No substantial number of charge carriers are present in the absence of an applied voltage.

Figure 3:
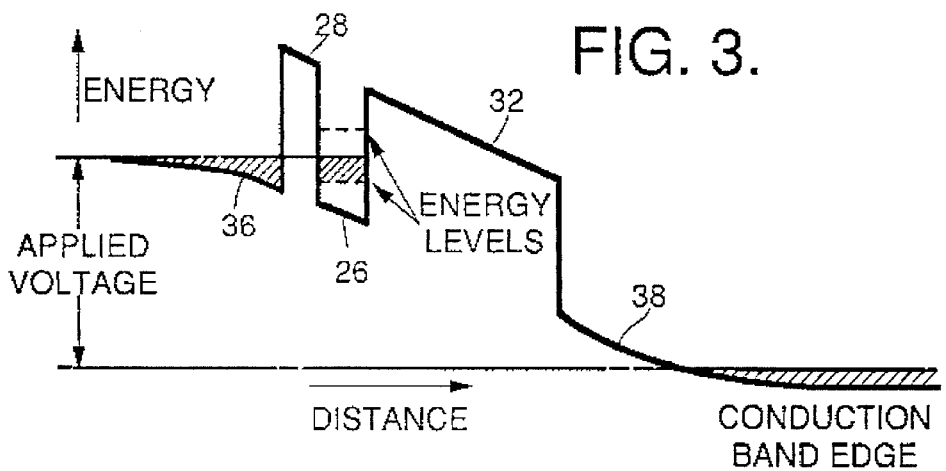
FIG. 3 is a graph indicating the effect of an applied voltage on the charge carrier distribution within the quantum well filter unit of FIG. 1.

When present, charge carriers (electrons or holes) residing in the lower energy level 50 can be promoted to the higher energy level 52 through the absorption of infrared light at an energy equal to the energy difference between the two subbands. As illustrated in FIG. 3, an appropriate voltage applied between the cladding layers 36 and 38 causes charge carriers to move from the doped cladding layer 36, through the first barrier layer 28, and into the quantum well layer 26. The charge carriers are blocked from flow to the second doped cladding layer 38 by the thicker second barrier layer 32. (The cladding layer 38 is provided as an electrical contact, and also as a source of charge carriers for the next quantum well filter unit that may be placed to the right of that shown in FIG. 1, as will be discussed subsequently.)

Figure 4:
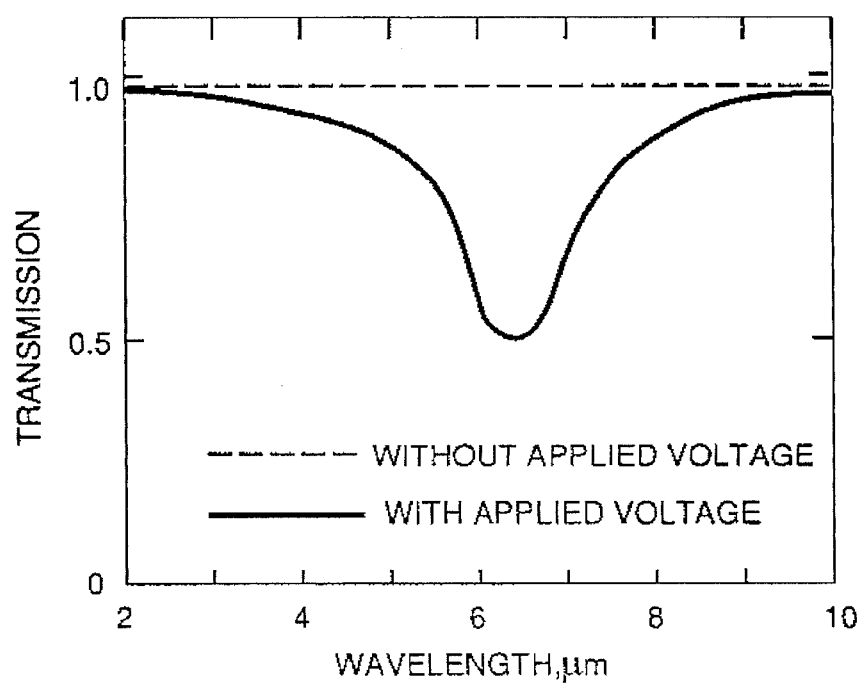
FIG. 4 is a graph of transmission as a function of wavelength in the infrared region, for the single quantum well filter unit of FIG. 1, without and with an applied voltage.

With an applied voltage on the order of about 1 volt, the lower subband 50 is populated with charge carriers. These charge carriers can be excited to the upper subband 52 by infrared energy of the appropriate wavelength, resulting in absorption of infrared energy by the quantum well filter unit 24. FIG. 4 shows the result of applying a voltage on the infrared transmission through the filter unit 24. When no voltage is applied, there is nearly complete transmission at all relevant wavelengths. When a voltage is applied, absorption occurs within a band characteristic of the geometry and materials of construction of the quantum well filter unit 24.

Figure 6:
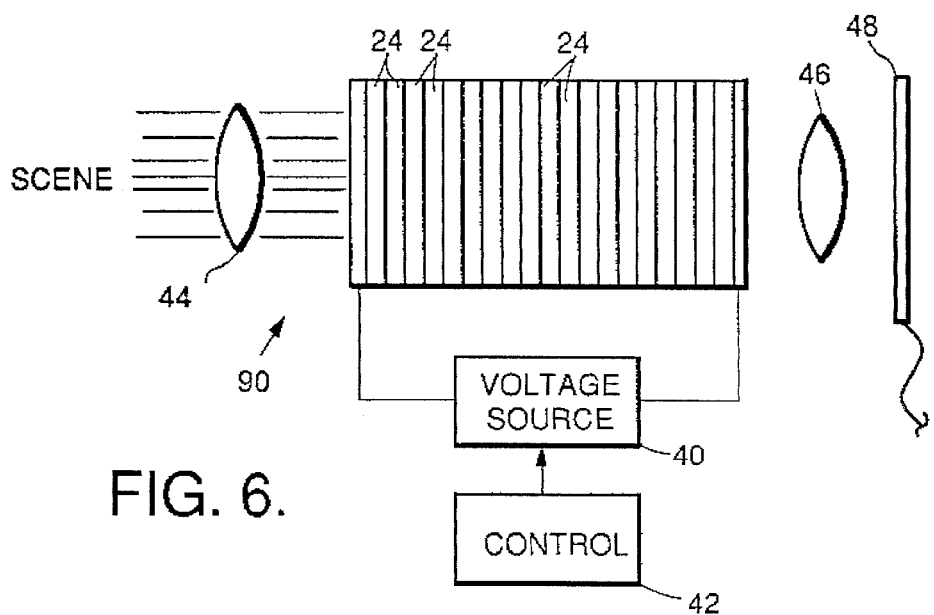
FIG. 6 is a schematic view of a filter employing multiple quantum well filter units of the same type.

The quantum well filter unit 24 is preferably fabricated by molecular beam epitaxial growth of the layers 36, 28, 26, 32, and 38, in that order or in the reverse order. The doped cladding layers 36 and 38 are typically about 200 Angstroms thick. (When stacked structures of the type discussed below in relation to FIG. 6 are prepared, the layers 38 and 36 of adjacent filter units are in contact with each other, and each of the layers 38 and 36 can therefore be about 100 Angstroms thick for a total thickness of about 200 Angstroms.) The first barrier layer 28 is typically from about 10 Angstroms to about 50 Angstroms thick. The quantum well layer 26 is typically from about 20 Angstroms to about 80 Angstroms thick. The thinner the quantum well layer within the indicated range, the shorter the wavelength of the band of absorption depicted in FIG. 4. The second barrier layer 32 is typically from about 100 Angstroms to about 300 Angstroms thick. In all cases of the first embodiment shown in FIG. 1, one of the barrier layers is thicker than the other.

A number of different materials of construction can be used. For example, in one combination the quantum well layer may be gallium arsenide, the cladding layers can be beryllium-doped gallium arsenide, and the barrier layers can be aluminum arsenide. In another combination, the quantum well layer can be gallium antimonide, the cladding layers can be tellurium-doped gallium antimonide, and the barrier layers can be aluminum antimonide. In another combination, the quantum well layer can be silicon germanium, the cladding layers can be boron-doped silicon germanium, and the barrier layers can be silicon or germanium. In another combination, the quantum well layer can be gallium indium arsenide, the cladding layers can be beryllium-doped indium gallium arsenide, and the barrier layers can be indium phosphide. In another combination, the quantum well layer can be gallium antimonide, the cladding layers can be silicon-doped gallium antimonide, and the barrier layers can be aluminum antimonide. These combinations are provided as examples, and other combinations are possible.

Figure 5:
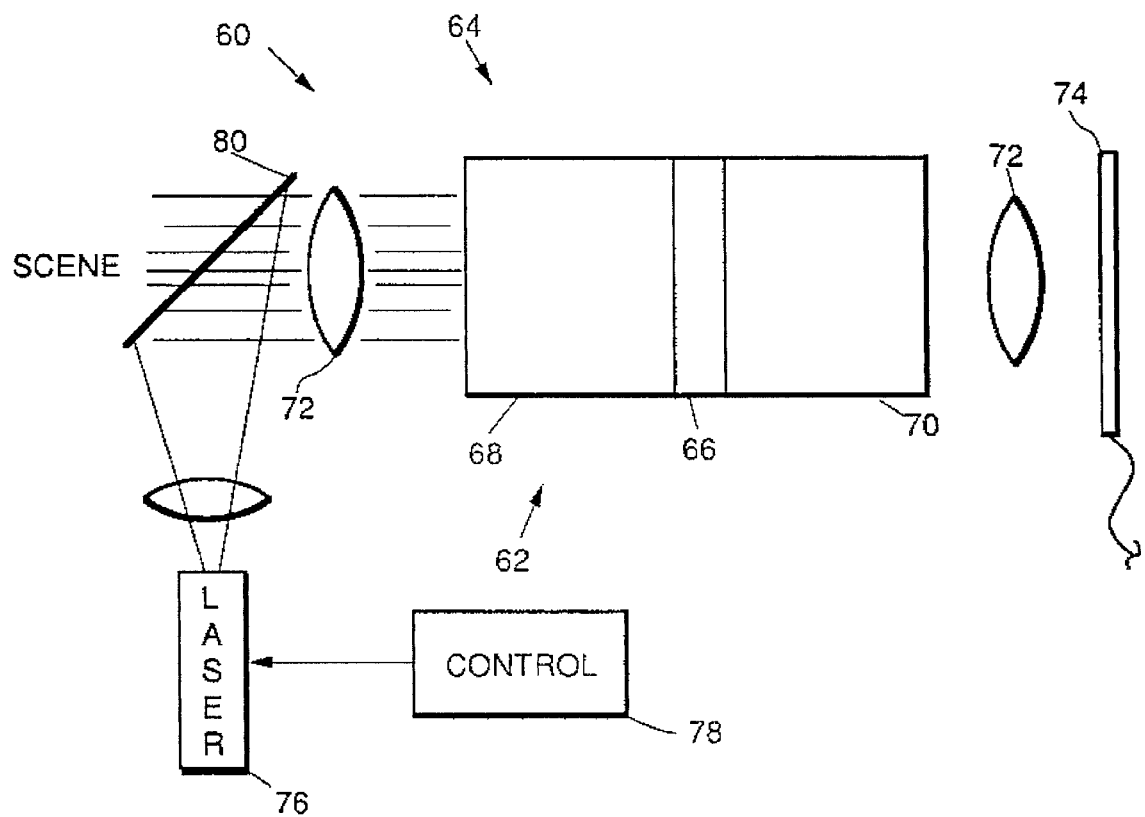
FIG. 5 is an enlarged, schematic side elevational view of a second embodiment of an infrared filter with a single quantum well filter unit.

FIG. 5 depicts another embodiment of the invention. A sensor system 60 includes a filter 62. The filter 62 has a quantum well filter unit 64, which is composed of a quantum well layer 66 and two barrier layers 68 and 70, one on each side of the quantum well layer 66. In this embodiment, the barrier layers 68 and 70 can be of equal thickness, as they function only to create subbands in the quantum well layer 66, or they may be of unequal thickness. An optical system, indicated generically by the lenses 72, directs infrared energy from the scene through the quantum well filter unit 64 and to a detector 74. No cladding layers are needed, because charge carriers are supplied to the quantum well layer 66 by non-electrical means to be described next.

A laser 76, under command of a control 78, produces a laser beam that is directed into the quantum well layer 66. The laser beam has a wavelength that excites the production of charge carriers in the quantum well layer 66, thereby providing optical activation of the quantum well filtering mechanism described previously, rather than activation responsive to an applied electrical potential. In one design shown in FIG. 5, a partially silvered mirror 80 mixes the laser beam into the infrared energy of the scene, and directs both the laser beam and the infrared energy of the scene through the quantum well filter unit 64. The laser beam is absorbed completely by the filter, and therefore none of the energy of the laser beam reaches the detector 74. In one operable approach, the laser beam has a wavelength of 0.8 microns, below the desired infrared wavelength range for the system, but capable of exciting charge carriers in the quantum well layer 66. A typical system incorporating an indium antimonide detector 74, for example, is sensitive to infrared radiation in the 3–5 micron wavelength range.

As shown in FIG. 4, even when activated by an applied voltage, a single quantum well filter unit 24 or 64 achieves only a modest degree of attenuation in the filtered band of interest. The effective attenuation can be improved by utilizing a plurality of the quantum well filter units together, as shown in FIG. 6, to form a filter 90. Here, the quantum well filter units are shown as the first embodiment 24, but they could be the second embodiment 64 or other possible embodiments. The voltage from the voltage source can be applied across each individual quantum well filter unit 24 in the manner depicted in FIG. 1, or a single voltage can be applied across the entire group of quantum well filter units 24 as shown in FIG. 6. The doped cladding layers between each pair of filter units can be fabricated as a single layer that provides charge carriers to the adjacent quantum well. In this form of filter having a plurality of quantum well filter units, the attenuations within the filtered band are effectively multiplicative. That is, if the maximum attenuation factor for a single quantum well filter unit is 0.5, then for two quantum well filter units in series the attenuation factor is 0.25, for three quantum well filter units in series the attenuation factor is 0.125, etc.

Figure 7:
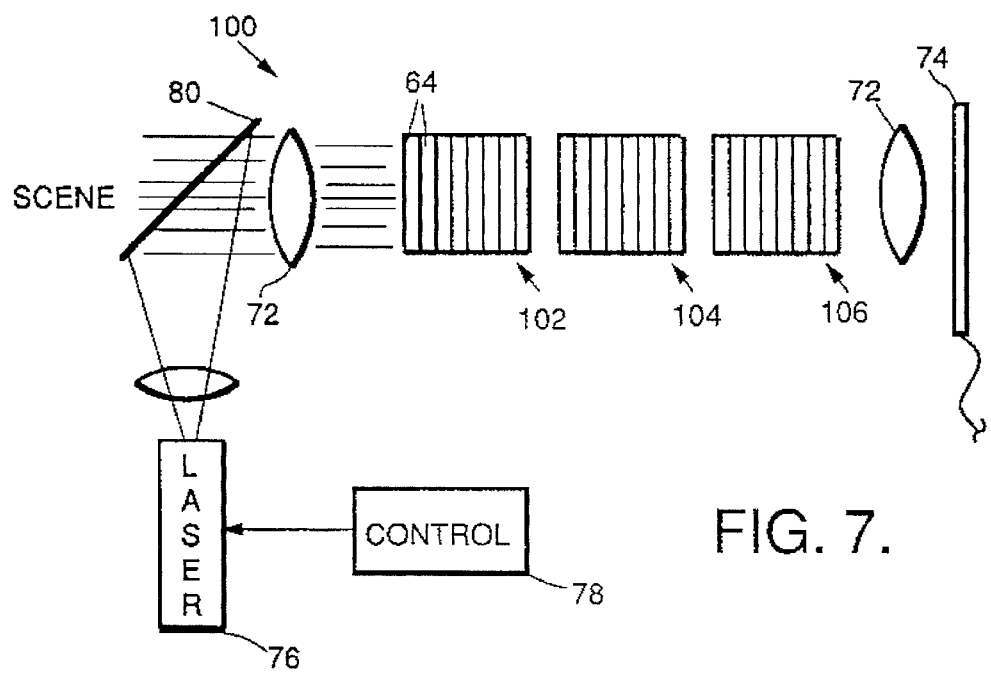
FIG. 7 is a schematic view of a filter employing multiple quantum well filter units of different types.

The filter 90 of FIG. 6 is operable to controllably filter a single selected bandwidth of infrared energy. Other bands can be filtered by providing a filter 100, as shown in FIG. 7. The filter 100 is shown as being based upon the second embodiment of FIG. 5, but it could be based upon the first embodiment of FIG. 1 or other embodiments of the quantum well filter unit.

The filter 100 has several, here shown as three, filter arrays 102, 104, and 106 of fixed-band pass quantum well filter units 64. The filter arrays 102, 104, and 106 are arranged so that the infrared radiation from the scene passes through all of the filter arrays. The quantum well filter units of each of the filter arrays are comparable in construction to those discussed in relation to FIG. 5, but are tailored to be absorbent for different bands within the infrared spectrum. For example, the respective quantum wells of the quantum well filter units found in the filter arrays 102, 104, and 106 could be made of different thicknesses so as to define subbands that absorb at different wavelengths of incident energy. Thus, the filter array 102 might have quantum wells of 80 Angstroms thickness, the filter array 104 might have quantum wells of 70 Angstroms thickness, and the filter array 106 might have quantum wells of 50 Angstroms thickness.

Figure 8:
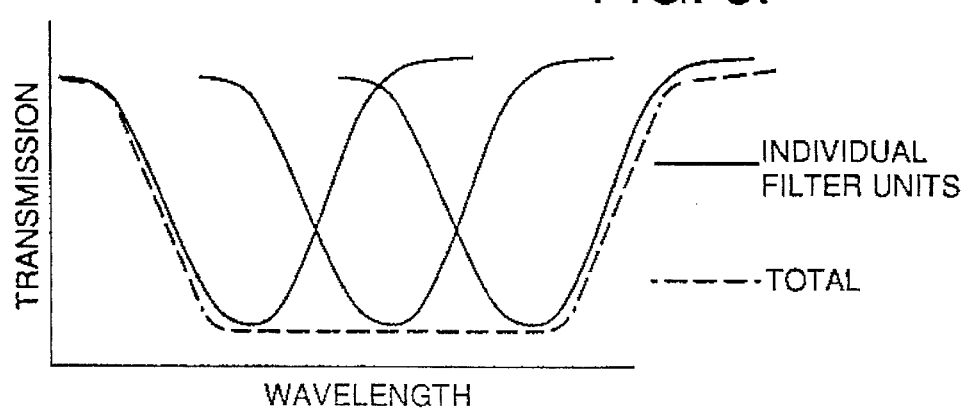
FIG. 8 is a graph of transmission as a function of wavelength in the infrared, for the multiple quantum well unit system of FIG. 7.

FIG. 8 depicts the attenuation of the filter 100 of FIG. 7. The bandwidth of the attenuated band is broadened because of the multiple filter arrays 102, 104, and 106. In this case, by virtue of the mode of construction all of the filter arrays are either on or off. If the electrically controllable approach of the first embodiment of FIG. 1 were used instead, the filter arrays could be turned on or off in selected combinations to block or pass various combinations of infrared bands.

Figure 9:
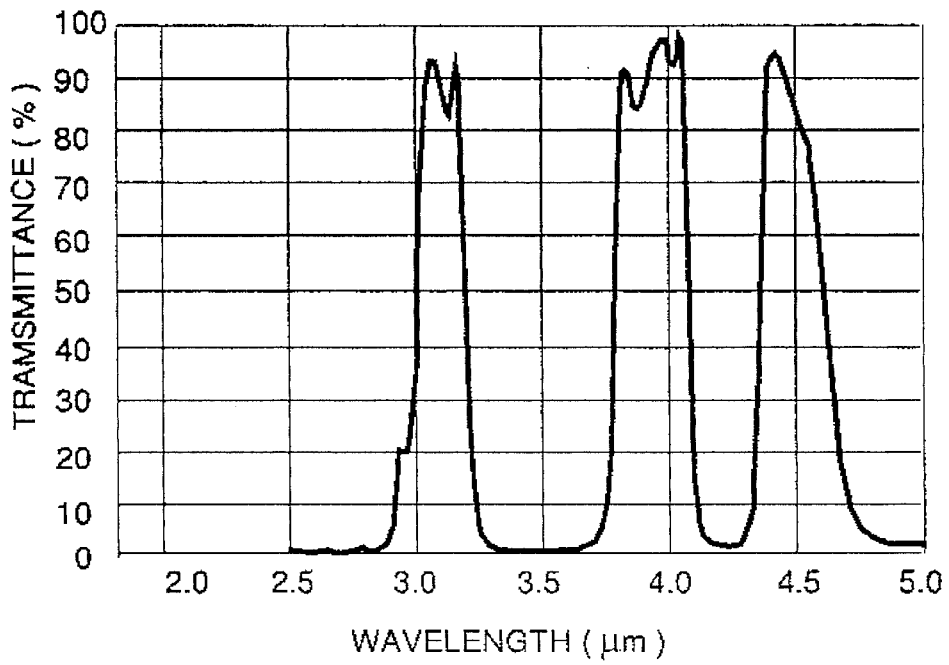
FIG. 9 is a graph of transmission as a function of wavelength in the infrared region for three fixed filters.

If accurate spectral tailoring is required, the quantum well filter(s) can be used in conjunction with conventional fixed band pass optical filters that are placed in the optical train in series with the quantum well filter(s). Such conventional fixed band pass optical filters and their fabrication are well known in the art. By way of example, the spectral response characteristic of three such fixed filters covering slightly different band widths, and placed in series, is shown in FIG. 9.

Figure 10:
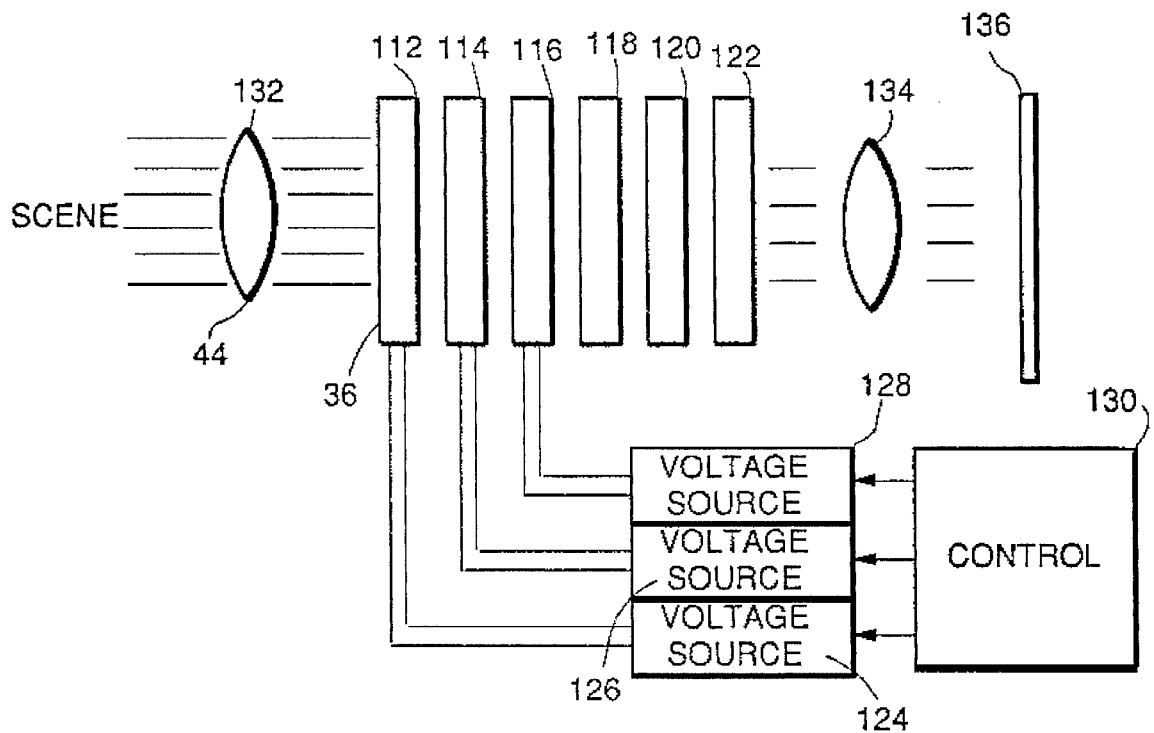
FIG. 10 is a schematic view of a filter employing three quantum well filter units and three fixed filters in series in an optical train.

FIG. 10 depicts a filter 110 in which three controllable quantum well filters 112, 114, and 116 are placed in series in the optical train with three fixed band pass optical filters 118, 120, and 122. The quantum well filters 112, 114 and 116 can be activated by either of the electrical or laser techniques discussed previously. In this depicted embodiment, the quantum well filters are shown as activated by three independent voltage sources 124, 126, and 128. The voltage sources in turn are controlled by a control 130 that activates the quantum well filters in some coordinated fashion. An optical system represented by lenses 132 and is provided to direct the energy from the scene through the filter and onto a device such as a detector 136.

Figure 11:
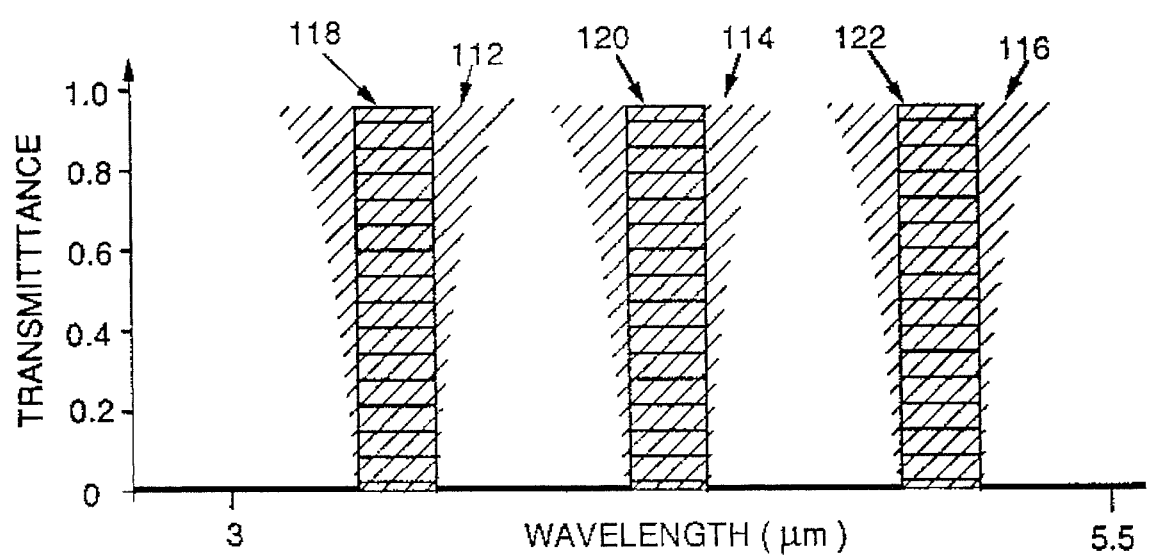
FIG. 11 is a graph of transmission as a function of wavelength in the infrared region for a filter of the type depicted in FIG. 10.

FIG. 11 shows the spectral transmission function that can be obtained when the controllable quantum well filters of the invention are placed into an optical train In series with such fixed band pass optical filters, as shown in FIG. 10. In such a device, each of the three quantum well filters can be controllably turned on or off by the application of a voltage or use of a laser to obtain a controllable spectral response that is superimposed upon the spectral response of the fixed filters. By this series placement of selected combinations of controllable quantum well filters of the same or different types, and fixed filters of the same or different types, a wide range of controllably tailorable spectral responses can be obtained In a single filter unit positioned in the optical train ahead of the detector or other optical device.

The ability to select the bands of infrared energy falling on the detector is a particular advantage of the present invention. The most favored band of energy to sense can depend upon the content of the scene including the objects of interest and clutter, lighting conditions, countermeasures in a military environment, the range of the scene, and other factors. The ability to select the band of infrared energy reaching the detector, reliably, quickly, and without mechanical devices, greatly increases the utility of the sensor system.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A controllable infrared filter comprising a quantum well filter unit operable to absorb infrared energy at a selected wavelength, the quantum well filter unit having:

a quantum well layer made of an infrared transparent semiconductor material;

a first barrier layer made of a second infrared transparent semiconductor material epitaxially contacting a first side of the quantum well layer and having a first barrier layer thickness;

a second barrier layer made of a third infrared transparent semiconductor material epitaxially contacting a second side of the quantum well layer and having a second barrier layer thickness;

means for controllably introducing charge carriers into the quantum well layer; and means for directing infrared radiation consecutively through the first barrier layer, the quantum layer, and the second barrier layer.

2. The filter of claim 1, wherein the quantum well layer has a thickness of from about 20 Angstroms to about 80 Angstroms.

3. The filter of claim 1, wherein the second semiconductor material and the third semiconductor material are the same barrier material.

4. The filter of claim 1, wherein the quantum well material and the barrier material compositions are, respectively, selected from the group consisting of the pairs GaAs/AlAs, GaSb/AlSb, SiGe/Si, SiGe/Ge, and GaInAs/InP.

5. The filter of claim 1, wherein the means for controllably introducing charge carriers includes a laser having a beam controllably directed into the quantum well layer, the laser having a beam wavelength that creates charge carriers in the quantum well layer.

6. The filter of claim 1, wherein the means for controllably introducing charge carriers includes a first doped cladding layer in contact with the first barrier layer on a contact side remote from the quantum well layer, a second doped cladding layer in contact with the second barrier layer on a contact side remote from the quantum well layer, means for controllably applying a voltage between the first doped cladding layer and the second doped cladding layer, and wherein the first barrier layer thickness is less than the second barrier layer thickness.

7. The filter of claim 6, wherein the first barrier layer has a thickness of from about 10 Angstroms to about 50 Angstroms.

8. The filter of claim 6, wherein the second barrier layer has a thickness of from about 100 Angstroms to about 300 Angstroms.

9. The filter of claim 1, further including a first plurality of first additional quantum well filter units, each of the first additional quantum well filter units having a construction identical to that of the quantum well filter unit, and wherein the means for directing directs the same infrared radiation consecutively through the quantum well filter unit and each of the first plurality of first additional quantum well filter units.

10. The filter of claim 9, further including a second plurality of second additional quantum well filter units, each of the second additional quantum well filter units being operable to absorb infrared energy at a second selected wavelength, and wherein the means for directing directs the same infrared radiation consecutively through the quantum well filter unit, the first plurality of first additional quantum well filter units, and the second plurality of second additional quantum well filter units.

11. The filter of claim 1, further including at least one fixed band pass optical filter, and wherein the means for directing directs infrared radiation consecutively through the at least one fixed band pass optical filter as well as the first barrier layer, the quantum layer, and the second barrier layer.

12. A controllable infrared filter comprising a first plurality of first quantum well filter units, each first quantum well filter unit being operable to absorb infrared energy at a first selected wavelength, each first quantum well filter unit having a quantum well layer made of an infrared transparent semiconductor material, a first barrier layer made of a second infrared transparent semiconductor material epitaxially contacting a first side of the quantum well layer and having a first barrier layer thickness, a second barrier layer made of the second infrared transparent semiconductor material epitaxially contacting a second side of the quantum well layer and having a second barrier layer thickness greater than the first barrier layer thickness, a first doped cladding layer in contact with the first barrier layer on a contact side remote from the quantum well layer, a second doped cladding layer in contact with the second barrier layer on a contact side remote from the quantum well layer, and means for controllably applying a voltage between the first doped cladding layer and the second doped cladding layer; and means for directing infrared radiation consecutively through the quantum well layer, the first barrier layer, and the second barrier layer of each of the quantum well filter units.

13. The filter of claim 12, wherein the quantum well layer has a thickness of from about 20 Angstroms to about 80 Angstroms.

14. The filter of claim 12, wherein the quantum well material and the barrier material compositions are, respectively, selected from the group consisting of the pairs GaAs/AlAs, GaSb/AlSb, SiGe/Si, SiGe/Ge, and GaInAs/InP.

15. The filter of claim 12, further including a second plurality of second quantum well filter units, each of the second quantum well filter units being operable to absorb infrared energy at a second selected wavelength different from the first selected wavelength, and wherein the means for directing directs the same infrared radiation consecutively through the first plurality of quantum well filter units and the second plurality of second quantum well filter units.

16. The filter of claim 12, wherein the first barrier layer has a thickness of from about 10 Angstroms to about 50 Angstroms, and the second barrier layer has a thickness of from about 100 Angstroms to about 300 Angstroms.

17. The filter of claim 12, further including at least one fixed band pass optical filter, and wherein the means for directing directs infrared radiation consecutively through the at least one fixed band pass optical filter as well as each of the quantum well filter units.

18. A controllable infrared filter comprising a first plurality of first quantum well filter units, each first quantum well filter unit being operable to absorb infrared energy at a first selected wavelength, each first quantum well filter unit having a quantum well layer made of an infrared transparent semiconductor material, a first barrier layer made of a second infrared transparent semiconductor material epitaxially contacting a first side of the quantum well layer and having a first barrier layer thickness, a second barrier layer made of a third infrared transparent semiconductor material epitaxially contacting a second side of the quantum well layer and having a second barrier layer thickness, and a laser having a beam controllably directed into the quantum well layer, the laser operating at a beam wavelength that creates charge carriers in the quantum well layer; and means for directing infrared radiation consecutively through the quantum well layer, the first barrier layer, and the second barrier layer of each of the quantum well filter units.

19. The filter of claim 18, wherein the quantum well layer has a thickness of from about 30 Angstroms to about 150 Angstroms.

20. The filter of claim 18, wherein the second semiconductor material and the third semiconductor material have the same barrier material.

21. The filter of claim 18, wherein the quantum well material and the barrier material compositions are, respectively, selected from the group consisting of the pairs GaAs/AlAs, GaSb/AlSb, SiGe/Sl, SlGe/Ge, and GaInAs/InP.

22. The filter of claim 18, further including a second plurality of second quantum well filter units, each of the second quantum well filter units being operable to absorb infrared energy at a second selected wavelength different from the first selected wavelength, and wherein the means for directing directs the same infrared radiation consecutively through the first plurality of quantum well filter units and the second plurality of second quantum well filter units.

23. The filter of claim 18, further including at least one fixed band pass optical filter, and wherein the means for directing directs infrared radiation consecutively through the at least one fixed band pass optical filter as well as each of the quantum well filter units.

* * * * *